Figure 1:
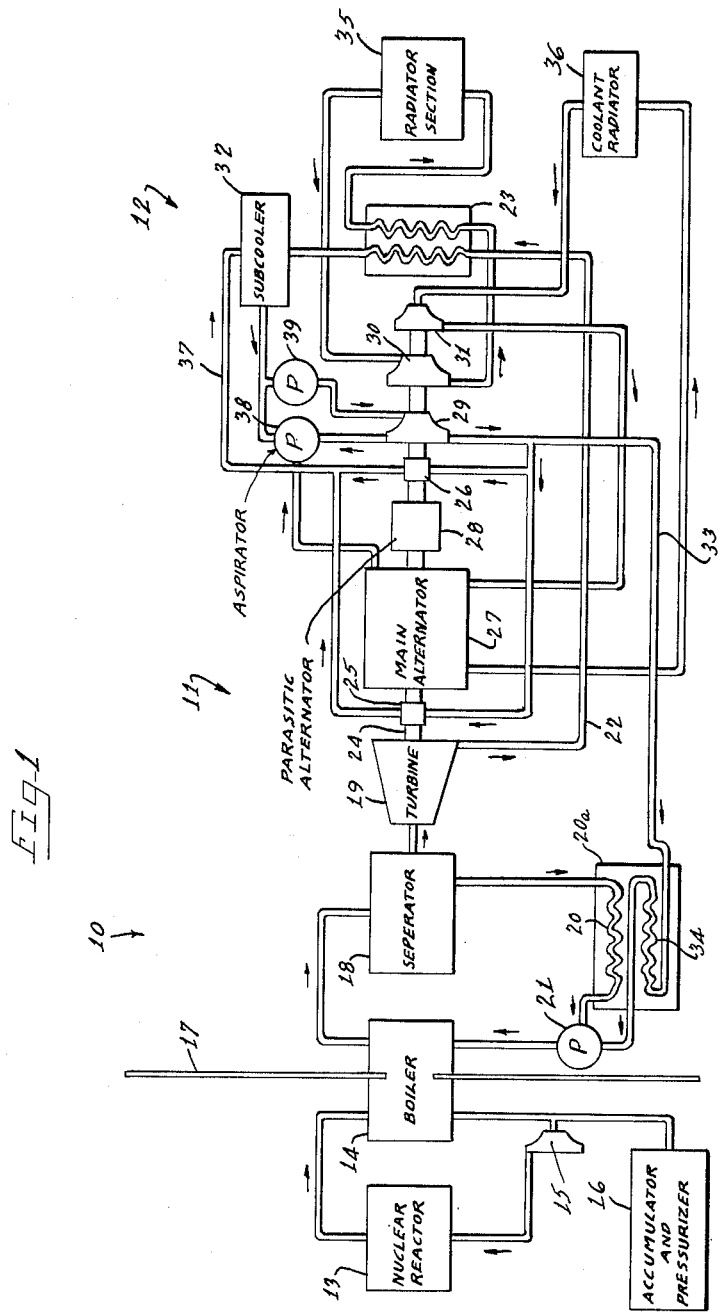

Nov. 23, 1965    E. RAY ETAL    3,219,831
TURBOELECTRIC SPACE POWER PLANT
Filed Dec. 22, 1960    2 Sheets-Sheet 1

Inventors
Edward Ray
Daniel P. Ross
John E. Taylor by Hill, Sherman, Meroni, Gross & Simpson
Attys.

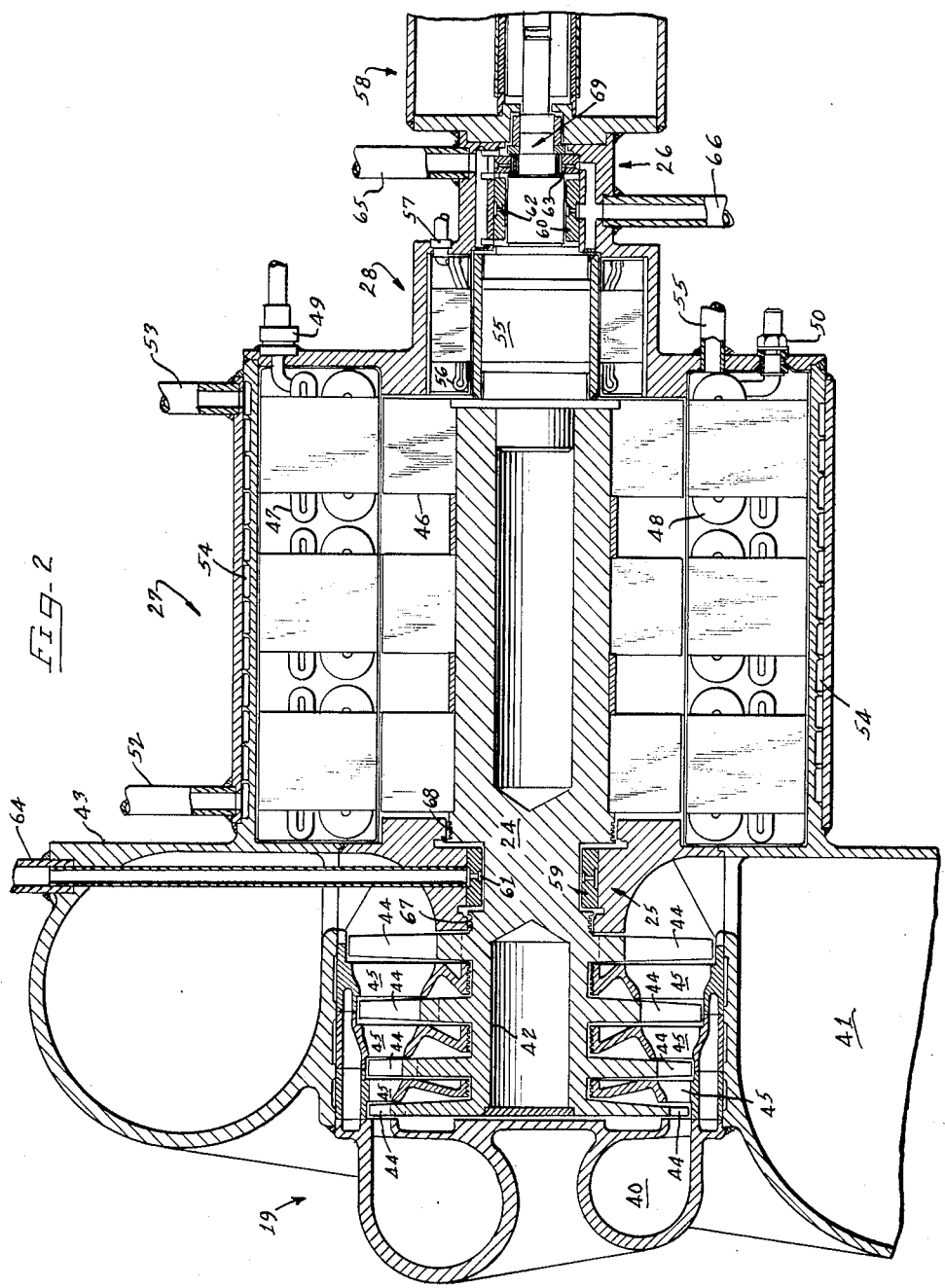

United States Patent Office 3,219,831
Patented Nov. 23, 1965

3,219,831
TURBOELECTRIC SPACE POWER PLANT
Edward Ray, Beechwood, Daniel P. Ross, Lyndhurst, and John Edward Taylor, East Cleveland, Ohio, assignors to TRW Inc., a corporation of Ohio
Filed Dec. 22, 1960, Ser. No. 77,738
4 Claims. (Cl. 290—2)

This invention relates to electrical power generating equipment and, more particularly, to a relatively large electrical power generating plant for space applications.

Relatively large electrical power generating plants designed for installation in space vehicles such as missiles must meet several severe requirements. They must be relatively compact and light weight as well as efficient in operation, and they must be capable of adapting to a wide range of operation at relatively high temperatures and power levels. Furthermore, the design must permit a flexible arrangement of the various components making up the power plant so that the plant can be installed in various space vehicles.

Accordingly, it is an object of this invention to provide a power plant which is suited for installation in space vehicles and meets the above described requirements.

Other objects, features and advantages of the present invention will be more apparent from the following detailed description taken in conjunction with the accompanying figures of the drawings, in which:

FIGURE 1 is a schematic illustration of a turbo-electric machinery system constructed in accordance with the invention; and FIGURE 2 is a sectional view of a portion of the turbo-electric machinery illustrated in FIGURE 1.

As shown on the drawings:

The system illustrated in FIGURE 1 includes equipment 10 for generating a high temperature vapor under pressure, equipment 11 for converting the power in this vapor to electrical power, and auxiliary equipment 12 for the system such as pumps, condensers, etc. The vapor generating equipment 10 employs a conventional nuclear reactor 13 as a heat source, although other means such as a solar heat source can be used. This reactor includes a nuclear core through which flows a liquid coolant which is preferably a liquid metal. This coolant is circulated through the nuclear reactor 13 and a heat exchanger or boiler 14 by a canned rotor circulating pump 15. An accumulator and pressurizer 16 is also connected into the primary flow circuit to prevent the fluid from boiling and to keep the volume of this fluid in the primary circuit constant.

The heat exchanger 14 may also be a conventional type and is required because the coolant flowing through the nuclear reactor 13 becomes radioactive. Therefore, by providing a heat exchanger and a shield 17 between the primary and secondary circuits the turbine and alternator area is made safe for personnel working on the turbine and alternator. A suitable type of boiler for this purpose is one wherein the heated primary fluid is circulated through primary coils which are submerged in the secondary working fluid. The secondary working fluid is then heated by this process and the resulting vapor is passed through the secondary flow circuit to a separator 18. This separator 18 separates the moisture from the vapor and directs the vapor to a turbine 19 and the moisture to a coil 20 in a heat exchanger 20a. In this exchanger 20a the exhaust from a boiler feed pump 29 is preheated as it flows through a coil 34 and the moisture in the coil 20 is cooled before it is returned to the heat exchanger 14 by jet pump 21.

The high temperature and pressure vapor from the separator 18 is directed to the vapor intake line of the turbine 19 where it causes the turbine rotor to rotate as it expands. The exhaust vapor from the turbine 19 is then directed through a conduit 22 to a condenser 23 and a subcooler 32. The rotor for the turbine 19 is mounted on a shaft 24 which is supported by bearings. A main alternator or generator 27 and a secondary or auxiliary alternator 28 are mounted on the shaft. It is apparent that as the turbine 19 is driven by the vapor the alternators 27 and 28 will also rotate and generate electrical power.

Also mounted on the shaft 24 are three pumps 29, 30 and 31. The pump 29 circulates the condensed and subcooled fluid back to the heat exchanger or boiler 14 through the heat exchanger 20a. The condensed fluid is returned by way of a conduit 33 to the heat exchanger 20a. The pump 30 is a radiator coolant pump which circulates the cooling fluid in the condenser 23 through a radiator section 35. The pump 31 is also a coolant pump which circulates fluid through the main alternator 27 and a coolant radiator 36 in order to reduce the temperature in the alternator 27. A portion of the fluid from the outlet opening of the condensate pump 29 is directed to the two bearings 25 and 26. This fluid acts as a lubricant for these two bearings and it is returned to the subcooler 32 by way of a conduit 37.

An aspirator mechanism 38 is connected to the interior of the main alternator 27 and maintains a low pressure in the alternator cavity to prevent formation of a liquid by condensation of the working fluid. Another pump 39, preferably a jet pump, is connected between the subcooler 32 and the condensate pump 29.

The system described operates according to the Rankine cycle. Mechanical energy is extracted from the working fluid by expanding it through a turbine which is connected to drive an electrical alternator. The exhaust from the turbine is then condensed in a compact condenser, subcooled, and then pumped back to the heat exchanger to complete the cycle. Heat rejection from the condenser is achieved by circulating a coolant to the condenser and a radiator.

The rotating machinery, which includes a turbine, two alternators, and three pumps, are all mounted on a single shaft. The two alternators are mounted between the journal bearings with the turbine and pumps cantilevered from opposite ends of the shaft.

The working fluid is preferably a high temperature type such as potassium, rubidium, sodium, etc. and the coolant fluids for the alternator and the condenser utilize a same or similar material. The system also utilizes subcooled working fluid as a lubricant for the bearings.

Since the loops in this system operate at different temperatures, partial sealing and temperature isolation between the elements is required. The two alternators, which are in the relatively cool environment between the turbine exhaust and the pumps, are maintained at operating temperature level by the alternator coolant.

The turbo-electric equipment is illustrated in greater detail in FIGURE 2. The turbine 19 includes a vapor intake line 40 which receives the vapor from the separator 18, and a vapor exhaust line 41 which is connected to the condenser 23. A rotor 42 is rotatably mounted within the turbine housing 43 and has a plurality of rotor blades 44 mounted on it. A plurality of stationary blades 45 mounted on the housing 43 direct the vapor through the rotor blades 44.

The alternator 27 has its rotor 46 also mounted on the shaft 24. The armature windings 47 and 48 are connected to two output terminals 49 and 50 which are mounted on the housing 43. The alternator coolant that is circulated by the pump 31 is fed into two conduits 52 and 53 and through a spiral passageway 54 formed in the housing 43. The coolant flowing through this passageway removes heat from the alternator housing and maintains the alternator at the proper operating temperature. As previously stated, the pressure within the alternator cavity is maintained at a relatively low value by the aspirator 38 which is connected to a coupling 55 mounted on the alternator housing.

The parasitic or secondary alternator 28 also has its rotor 55 coupled to the shaft 24. The armature winding 56 for this alternator 28 is connected to a power output terminal 57 and to a suitable parasitic load bank (not shown) in order to maintain a constant load on the alternator 27 for constant speed operation.

The apparatus 58 is a coupling arrangement between the two sections of the shaft 24, the section to the left of the coupling 58 being the portion on which the turbine and the alternators are mounted and the section to the right of the coupling 58 being the portion on which the pumps are mounted. These pumps and the couplings leading to them are conventional in their construction and, therefore, are not shown in detail.

The two bearings 25 and 26 for the system include two sleeves 59 and 60 which have passageways 61, 62 and 63 formed in them for the bearing lubricant. The lubricant for the bearing 25 is circulated by a conduit 64 and a second conduit (not shown), and the lubricant for the bearing 26 is circulated through the bearing by two conduits 65 and 66.

Partial sealing and temperature isolation is provided at 67 and 68 on each side of the bearing 25 between the alternator 27 and the turbine 19. This is required since these elements operate at different temperatures and pressures. Sealing is also provided at 69 adjacent the bearing 26 and the pumps 29, 30 and 31 are similarly isolated in a conventional manner since these elements also operate at different temperatures.

A turbo-electric machinery system constructed in accordance with the invention has several advantages over conventional systems. Since the rotary radiator heat transfer fluid and coolant drive pumps are mounted on the same shaft as the turbine and the generators, the system has the advantage of simplicity and reliability over separate motor driven pumps. Further, this construction permits a more flexible arrangement of the large radiators associated with large power plants adapted for space applications. Another advantage is that the alternators are able to operate at lower temperatures. This advantage is attained by the position of the alternators between the turbine and the pumps, by the partial sealing and temperature isolation between the elements, and by the coolant circuit through the main alternator. This provision for operation of the alternators at lower temperatures is critical in advanced space power designs which utilize high temperature working fluids such as potassium, rubidium, sodium, etc., and it eliminates windage losses and reduces corrosion problems. Also, provision is made for rapid light weight load control by placing a parasitic alternator on the shaft of the unit.

It will be apparent that modifications and variations may be effected without departing from the scope of the novel concepts of the present invention.

We claim as our invention:

1. A turbo-electric system comprising a turbine adapted to receive a high temperature and pressure vapor and convert the vapor into rotary mechanical energy, said turbine being mounted on a shaft, an alternator and first, second and third pumps mounted on said shaft, said alternator being mounted intermediate said turbine and said pumps, first bearing means for supporting said shaft between said turbine and said alternator, second bearing means for supporting said shaft between said alternator and said pumps, a condenser, said first pump being coupled to circulate the exhaust vapor from said turbine through said condenser, a condenser radiator, said second pump being coupled to circulate a coolant fluid through said condenser radiator and said condenser, a coolant passageway formed in said alternator, an alternator coolant radiator, said third pump being connected to circulate an alternator coolant fluid through said alternator coolant passages and said alternator coolant radiator.

2. A turbo-electric machinery system comprising a turbine mounted on a shaft adapted to convert the energy in a high temperature and pressure vapor into rotary mechanical energy, an alternator, and first, second and third rotary pumps coupled to said shaft, said alternator being mounted intermediate said turbine and said pumps, a first bearing between said turbine and said alternator and a second bearing between said alternator and said pumps for supporting said shaft, a vapor condenser, said first pump being adapted to circulate exhaust vapor from said turbine through said condenser, a condenser radiator, said second pump being adapted to circulate a condenser coolant through said condenser and said condenser radiator, a coolant passageway formed in said alternator, an alternator radiator, said third pump being adapted to circulate an alternator coolant to said alternator and said alternator radiator, means for maintaining the interior cavity of said alternator at a relatively low pressure, and means for circulating a portion of said condensed vapor from said condenser through said first and second bearings as a lubricant.

3. A turbo-electrical machinery package for space vehicles applications comprising a nuclear reactor, means for circulating a liquid to said nuclear reactor and a heat exchanger, means for circulating a fluid to said heat exchanger and a separator in order to generate a high temperature and pressure vapor, a turbine coupled to the output of said separator which is adapted to convert the energy content of said high temperature and pressure vapor into rotary mechanical energy, said turbine being mounted on a shaft, an alternator and first, second and third pumps coupled to said shaft, said alternator being mounted intermediate said turbine and said pumps, a first bearing supporting said shaft between said turbine and said alternator, a second bearing supporting said shaft between said alternator and said pumps, a condenser, said first pump being connected to circulate the exhaust vapor from said turbine to said condenser and said heat exchanger, a condenser radiator, said second pump being connected to circulate a coolant fluid to said condenser radiator and said condenser, a coolant passageway formed in said alternator, an alternator radiator, said third pump being connected to circulate a coolant fluid through said alternator passageway and said alternator radiator, means for maintaining the pressure in said alternator cavity at a relatively low value, sealing and temperature isolation means between said turbine and said alternator, a parasitic alternator mounted between said alternator and said second bearing, and means for subcooling and feeding a portion of the condensed vapor from said condenser to said first and second bearings as a bearing lubricant.

4. A turbo-electric machinery package for space vehicle applications comprising a nuclear reactor, a heat exchanger, means for circulating a liquid through said nuclear reactor and said heat exchanger, a separator, means for circulating a fluid through said heat exchanger and said separator in order to provide a high temperature and pressure vapor, a turbine mounted on a shaft which is adapted to convert the energy content in said high temperature and pressure vapor into rotary mechanical energy, an alternator and first, second and third rotary pumps mounted on said shaft, said alternator being mounted intermediate said pumps, a first bearing for supporting said shaft between said turbine and said alternator, a second bearing for supporting said shaft between said alternator and said pumps, said first pump being adapted to circulate the vapor exhaust from said turbine to a condenser, said second pump being adapted to circulate a coolant fluid through said condenser and a radiator, and said third pump being adapted to circulate a coolant fluid through said alternator and a radiator.

References Cited by the Examiner
UNITED STATES PATENTS

| | | | |
|---|---|---|---|
| 2,491,314 | 12/1949 | Hopkirk | 290—52 X |
| 2,949,731 | 8/1960 | Hambling | 290—52 X |
| 2,961,550 | 11/1960 | Dittman | 290—52 X |
| 3,061,733 | 10/1962 | Humpal | 290—52 |

CRIS L. RADER, *Primary Examiner.*

MILTON O. HIRSHFIELD, CHESTER L. JUSTUS,
*Examiners.*